(12) United States Patent
Cuber et al.

(10) Patent No.: US 10,969,042 B2
(45) Date of Patent: Apr. 6, 2021

(54) MAGNETIC CONNECTING MEMBER, IN PARTICULAR FOR PIPE FLANGES

(71) Applicant: Petr Cuber, Havirov-Zivotice (CZ)

(72) Inventors: Petr Cuber, Havirov-Zivotice (CZ); Monika Pullmanova, Vratimov (CZ)

(73) Assignee: Petr Cuber, Havirov-Zivotice (CZ)

( * ) Notice: Subject to any disclaimer, the term of this patent is extended or adjusted under 35 U.S.C. 154(b) by 289 days.

(21) Appl. No.: 15/769,519

(22) PCT Filed: Oct. 20, 2016

(86) PCT No.: PCT/CZ2016/050038
§ 371 (c)(1),
(2) Date: Apr. 19, 2018

(87) PCT Pub. No.: WO2017/067531
PCT Pub. Date: Apr. 27, 2017

(65) Prior Publication Data
US 2018/0313482 A1  Nov. 1, 2018

(30) Foreign Application Priority Data
Oct. 23, 2015 (CZ) .............................. PV 2015-747

(51) Int. Cl.
*F16L 37/00* (2006.01)
*F16L 23/036* (2006.01)
(Continued)

(52) U.S. Cl.
CPC ........... *F16L 23/036* (2013.01); *F16L 23/003* (2013.01); *F16L 37/004* (2013.01); *F16B 2001/0035* (2013.01)

(58) Field of Classification Search
CPC ....................... F16L 37/004; F16B 2001/0035
(Continued)

(56) References Cited

U.S. PATENT DOCUMENTS 2,793,057 A * 5/1957 McGugin .............. F16L 37/004
                                                    285/9.1
2,953,970 A * 9/1960 Maynard .................. G02B 7/00
                                                    359/611
(Continued)

FOREIGN PATENT DOCUMENTS

| DE | 102007016412 A1 | 10/2008 | | |
|---|---|---|---|---|
| FR | 1466542 A | 1/1967 | | |
| FR | 1466542 A | * | 1/1967 | ............. A62C 33/00 |

OTHER PUBLICATIONS

International Search Report for corresponding PCT application No. PCT/CZ2016/050038, dated Jan. 26, 2017.

*Primary Examiner* — David Bochna
(74) *Attorney, Agent, or Firm* — Notaro, Michalos & Zaccaria P.C.

(57) ABSTRACT

Pair of connecting plates contain on the backside pits fitted with magnets, while at the "connected" position the connecting plates are adjacent, they have identical axially oriented polarization. The pits have passage channels and are laid-out on imaginary circles, where the neighboring magnets have alternating polarization and by pairs and/or threes are covered with magnetic hasps fitted with hasp screws. Centering and disconnection are ensured with the help of centering holes, and possibly centering dimples, fitted with connecting/disconnecting devices. Additional passages placed between two circles with magnets can be added. Possible closing device is attached by spacing posts, spacing screws and ring.

13 Claims, 10 Drawing Sheets

(51) Int. Cl.
*F16L 23/00* (2006.01)
*F16B 1/00* (2006.01)

(58) Field of Classification Search
USPC .......................................................... 285/9.1
See application file for complete search history.

(56) References Cited

U.S. PATENT DOCUMENTS

| | | | | |
|---|---|---|---|---|
| 3,181,895 | A * | 5/1965 | Cator | F16L 37/004 |
| | | | | 285/1 |
| 4,004,298 | A | 1/1977 | Freed | |
| 4,225,191 | A * | 9/1980 | Knoski | B60B 3/16 |
| | | | | 301/35.627 |
| 4,540,199 | A | 9/1985 | Neill | |
| 5,096,230 | A * | 3/1992 | Pausch | B08B 15/00 |
| | | | | 285/304 |
| 5,624,410 | A * | 4/1997 | Tsukada | A61M 39/20 |
| | | | | 604/256 |
| 6,966,781 | B1 * | 11/2005 | Bullinger | H01R 13/6205 |
| | | | | 439/289 |
| 7,793,987 | B1 * | 9/2010 | Busch | A61M 16/0816 |
| | | | | 285/9.1 |
| 9,744,056 | B2 * | 8/2017 | Kuiken | A61F 2/80 |
| 9,849,551 | B2 * | 12/2017 | Ebihara | B23B 31/02 |
| 2009/0293238 | A1 | 12/2009 | Davis | |
| 2012/0319313 | A1 * | 12/2012 | Davis | B65D 43/0202 |
| | | | | 261/119.1 |
| 2013/0276923 | A1 * | 10/2013 | Wolff | F16L 37/004 |
| | | | | 137/614.02 |
| 2013/0285365 | A1 * | 10/2013 | Davis | F16L 37/004 |
| | | | | 285/9.1 |

\* cited by examiner

MAGNETIC CONNECTING MEMBER, IN PARTICULAR FOR PIPE FLANGES

TECHNICAL FIELD

The invention relates to the arrangement of magnetic connecting member intended for coupling of pipeline sections, particularly for pipeline flanges, or for connection of containers or for connection of vessels to the pipeline.

BACKGROUND ART

Currently, classic flanges are used for coupling of pipeline parts and for disconnectable connection of vessels, containers, tanks or other hollow chambers to a pipeline. These are cases of fitting with a plate in the shape of a flat ring, firmly fixed at the end of connected piping section, which is equipped with holes or thread, by means of which always two corresponding counterparts are fixed to each other.

The use of magnets for various purposes is known in technics. Magnets are often part of various holders, in which one or more magnets are fitted in/on the surface area of the holder as a component, to which by mere attaching various metal objects can be fastened on the holder. Furthermore, magnets are used for various magnetic couplings comprising a rotating part, and that not for the purpose of connection of parts, but for the purpose of attenuation or braking the rotational movement of the rotating part. The magnets are placed in these couplings perpendicularly to the axis of rotation of the rotating part, the arrangement of these couplings is relatively complicated and generally works only in combination with electric control, their technical solution does not relate in any way to the solution proposed hereinafter.

DISCLOSURE OF THE INVENTION

The above-mentioned disadvantages are eliminated to a considerable extent by the invention. New connecting member, in particular for pipe flanges, is designed that is intended for interconnection of ends of channels for gaseous or liquid medium, which channels are located in a pipeline and/or a vessel. The designed connecting member is magnetic. The essence of the new solution is in that the contact part for interconnection of the ends of channels, which are being connected to each other, is arranged as a pair of connecting plates of nonmagnetic material, the rear sides of which are equipped with set of pits, of which at least some pits are equipped with polarized magnets covered with clamps of magnetic material to prevent unwanted release. A connection is arranged from the pair of these connecting plates fastened to each other. The channel means here the interconnected cavity intended for flow of liquid or gaseous medium, which is located in the interconnected pipeline or outlet from the vessel and in a possible pipeline-linked part of the connecting member, that is in a pipeline section or a ring mentioned and described in details hereafter, which are parts of the connecting member. The pairs of connecting plates are created as counterparts with mutually linked-up passage for the medium, mutually contiguous front surfaces and with magnets, which are located in opposed mating position against each other when being in the position of connection of said interconnected connecting plates. With this state of connection, the individual magnets in each pair of the magnets situated in mating positions have identical polarization.

Preferably each said magnet fits to the bottom of the pit and is seated in it with its magnetic field axially, viewed compared with the axis of passage for the medium, while at the same time, the bottom of the pit is equipped with at least one passage channel, to improve penetration of magnetic field through the connecting plate and to facilitate removal of the magnet in the case of disassembly.

The pits equipped with the magnets are preferably laid out on the connecting plates on imaginary circles with center in the axis of the passage, and that in the number of at least one circle on each connecting plate. Because the connecting plates are arranged in a mirror-like way, then the circles created on one plate are of the same radius as the circles created on the other connecting plate! The neighboring magnets of the same plate have, within the framework of the same circle, preferably alternating polarization. Content of additional magnets outside these circles is not excluded.

At least one imaginary circle according to the previous paragraph contains 3 to 10 magnets that are laid-out on it at a distance from each other around the passage. Individual clamps for each pair and/or triplet of neighboring magnets of the same plate are preferably created on each circle equipped with said magnets.

The clamp is preferably equipped with at least one clamp screw against spontaneous release made of nonmagnetic material, while the threaded part of the clamp screw is fixed in the connecting plate.

The connecting plates have preferably flat and smooth front surfaces.

The connecting plates connected to each other are preferably equipped with opposite centering elements to facilitate connection in accurate position, where these centering elements are in the form of centering holes and/or centering dimples, which are in the state of connection of connecting plates fitted with connecting/disconnecting means for precise connection and subsequent disconnection of connecting plates by pushing away. Three preferred variants of concrete embodiment of connections with the connecting/disconnecting means are completely solved hereinafter.

The first variant is such, that the connecting plates are fixed to each other with the help of connections including mutually linked-up centering holes of the two connecting plates, the connecting/disconnecting means in the form of a centering screw imbedded through the centering hole of the first connecting plate into only a part of the centering hole of the second connecting plate and further including a pushing-away screw imbedded into the remaining part of the centering hole of the second connecting plate from opposite side. The connection is in the position "connected" in the state when the pushing-away screw is only partially screwed in, and the connection is in the position "disconnected" in the state when the pushing-away screw is fully screwed in.

The second variant is such, that the connecting plates are fixed to each other with the help of connections including centering hole of the first plate linked-up, in the position of connection of plates, to the centering dimple of the second plate, and including the connecting/disconnecting means in the form of centering screw imbedded through the centering hole of the first plate into the centering dimple of the second plate. The connection is in the position "connected" in the state when the centering screw is only partially screwed in, and the connection is in the position "disconnected" in the state when the centering screw is fully screwed in.

The third designed preferred variant is such, that the connecting plates are fixed to each other with the help of connections including centering holes of the first plate linked-up, in the position of connection of plates, to the centering dimples of the second plate, and including a thrust element with extensible mandrel imbedded through the centering hole of the first plate into the centering dimple of the second plate. The connection is in the position "connected" in the state when the extensible mandrel is only partially protruded, and the connection is in the position "disconnected" in the state when the extensible mandrel is maximally protruded.

Other additional solution relates to the option of simultaneous interconnection of additional channel or channels. In this case, the connecting plates being connected to each other are preferably equipped with at least two imaginary circles each, on which the magnets are laid out, and they are further equipped with at least two passages, of which the first, main, passage has its center in the axis of the imaginary circles, and each next additional passage is situated between the two imaginary circles.

Magnetic connecting member is preferably arranged as a unit detachably connectable to a common flange of pipeline or vessels. At least one connecting plate is equipped with a pipeline section running out at its rear side from its passage and terminated with a flange connectable to a common flange of pipeline and/or vessel being connected, i.e. in the optimal case chosen in the form of common flange with shape and dimensions identical to those of the flange present on the pipeline and/or vessel neck being connected. For interconnection of common flanges of pipelines and/or vessels, the magnetic member is equipped in this way with a terminal flange on both sides, i.e. near both connecting plates.

In the case that the pipeline being connected is ended with a closing device with a terminal flange, for example a pneumatic valve, then the closing device is connected to the connecting plate on its rear side, preferably by means of spacing posts, spacing screws, and a ring inserted into the interspace.

The embodiment of the connecting portion of the connecting member is preferably solved for connection of the ring in the following way. The ring and the connecting plates have the same passage as the terminal flange of the closing device, and if possible, the pipeline being connected also has the same passage. The ring is also equipped with sealing on both sides. The spacing posts run out on the backside of the connecting plate around the ring circumference and the stems of spacing screws, the heads of which are leaning on the terminal flange of the closing device, are fixed in them.

The invention allows quick and reliable connection of interconnected channels and if needed, also easy disconnection. It will find its application particularly in the field of gas engineering and power engineering as a means for connection of various types of pipeline with gas in explosive environment, where control by means of electric current cannot be used because of explosion due to possible spark, and also as a quick-coupling device. The invention can be utilized for cogeneration units, for highly flammable liquid tanks, as a quick-coupling device for water conduit e.g. for fire fighters, for connection of pipeline with chemicals, and also for couplings in food industry. The advantages of the invention include possibility of easy manual control even for large-capacity equipment, independence on electricity, hygienic configuration without contact with ambient environment. The independence on electricity brings another advantage in that the connection can be used and its connection/disconnection can be controlled even during a power failure. Significant advantages are represented also by that the connection strength can be adjusted at the site according to the calculation of actual demand, and that the magnets in the device can be replaced, for example with stronger or weaker or new ones in case of material fatigue, or optionally cumulated. Other advantage of the invention is possibility of versions from various materials such as stainless steel, ceramics, and plastics.

REVIEW OF FIGURES ON DRAWINGS

The invention is illustrated using drawings, where FIGS. 1 to 6 show magnetic connecting member according to the first example of embodiment and FIGS. 7 to 12 show magnetic connecting member according to the second example of embodiment, of which

EXAMPLES OF EMBODIMENT OF THE INVENTION

Example 1

Figure 1:
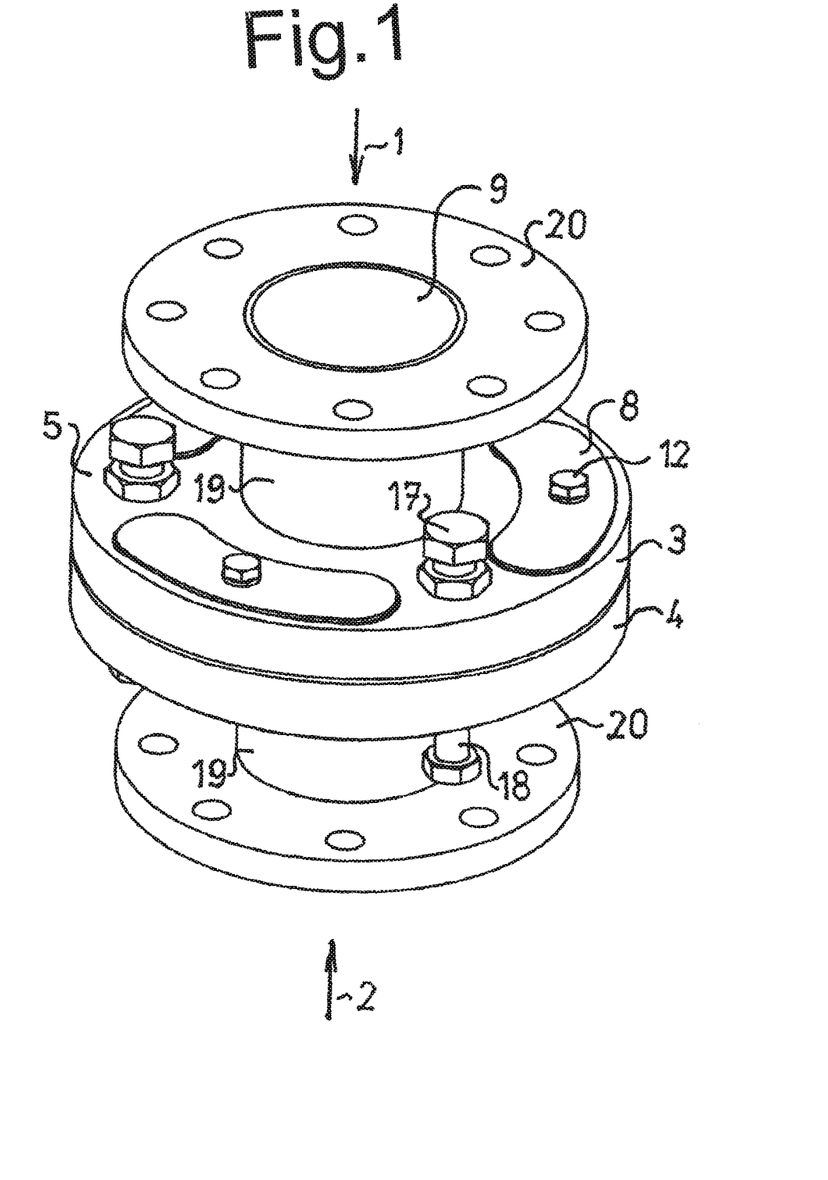
FIG. 1 shows perspective view of magnetic connecting member according to the first example of embodiment.
Figure 2:
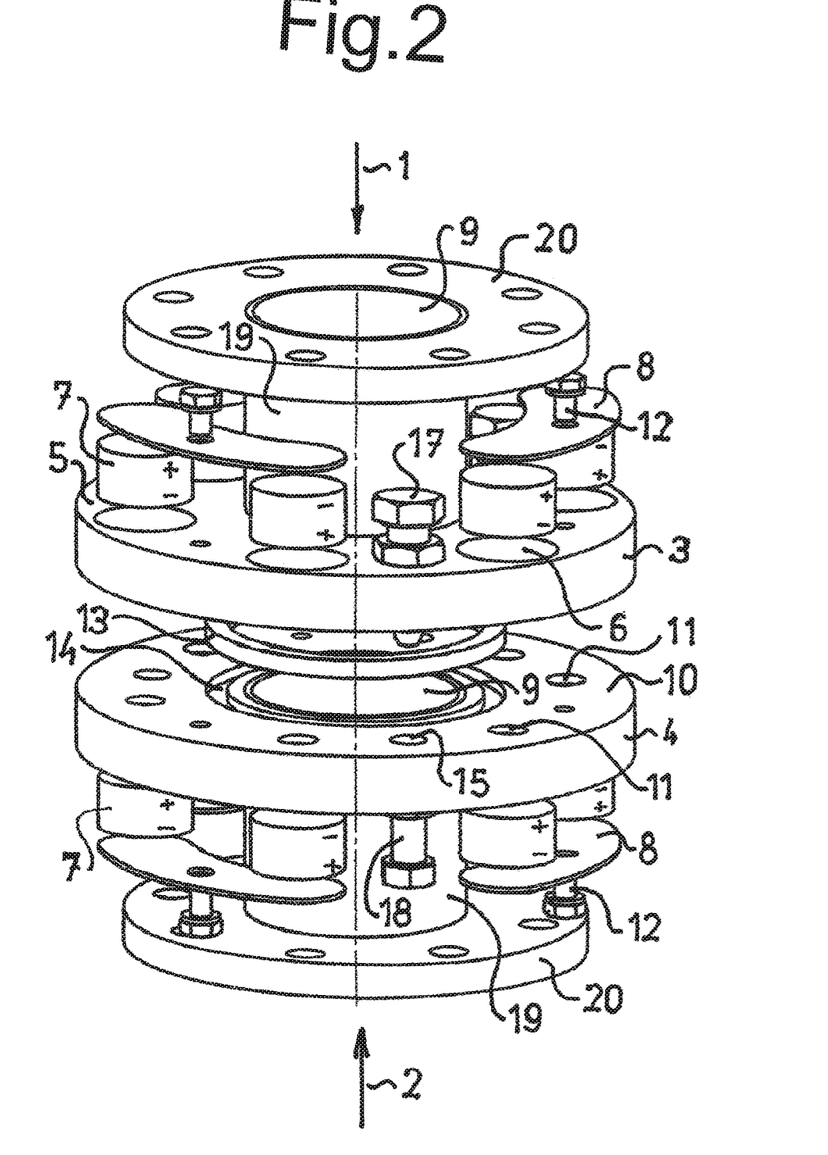
FIG. 2 shows perspective view on the same in partially disassembled state.
Figure 3:
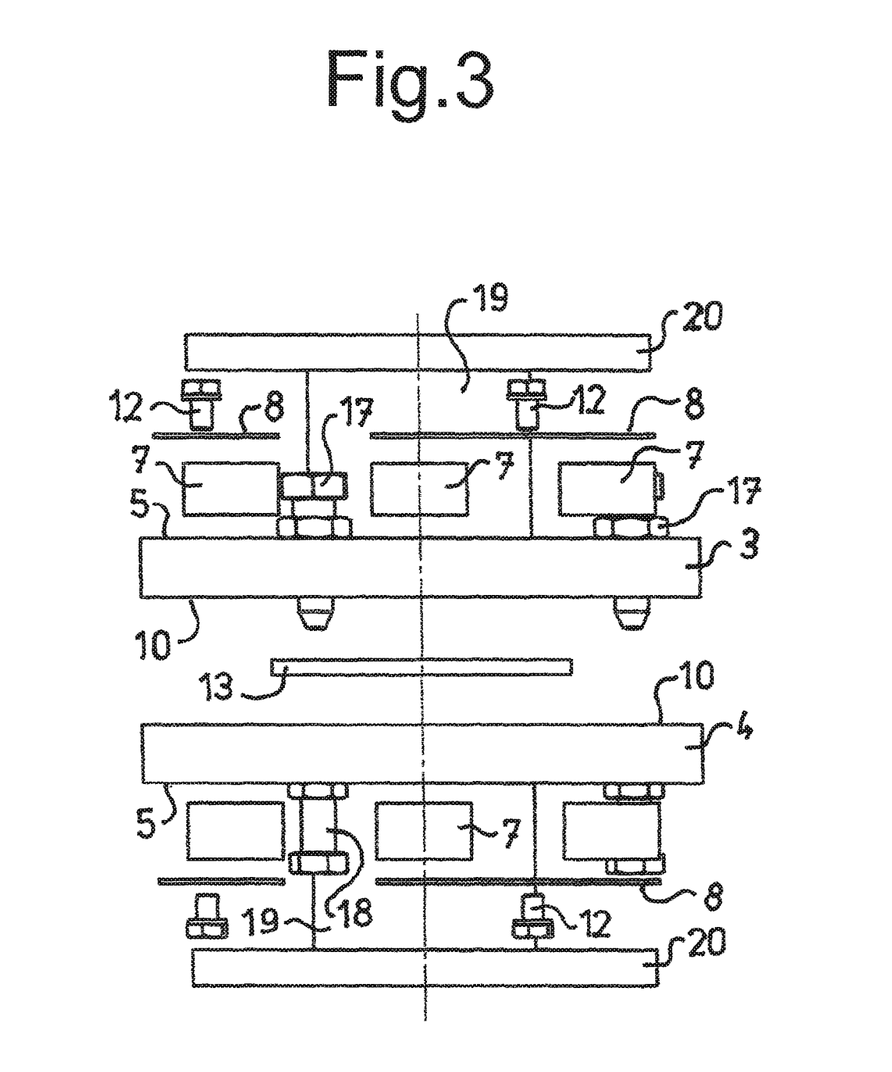
FIG. 3 shows side view on the same in a disassembled state.
Figure 4:
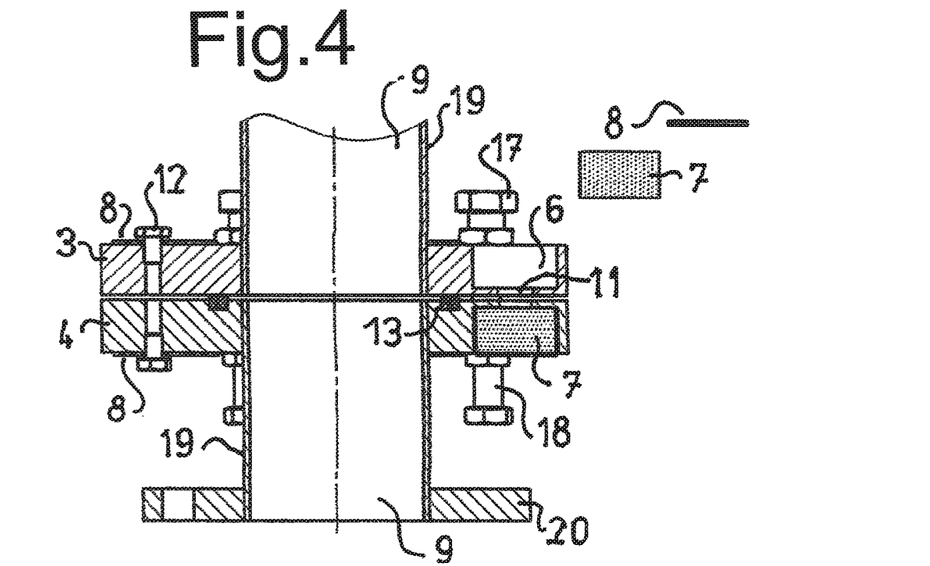
FIG. 4 shows side view of vertical section drawn along the line A-A indicated on the following figure, across the center of the same connecting member, however with the upper flange cut off, with illustration of clamp fastening and arrangement of pit with passage channel before placing the magnet as well as after placing the magnet.
Figure 5:
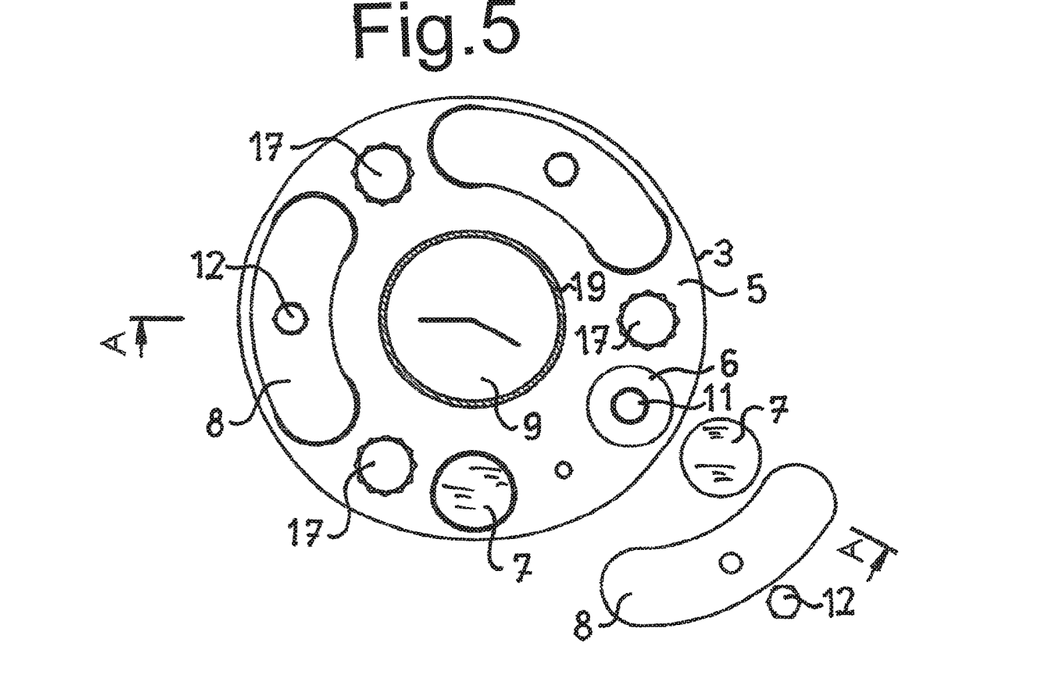
FIG. 5 shows top plan view of the assembly according to the previous figure, the connecting member has its upper flange cut off to show the arrangement of clamps, FIG. 6A, B shows detail of the connecting/disconnecting means of two centering holes, centering screw, and pushing-away screw, from which A shows it in the connected state and B in the disconnected state of connecting plates.
Figure 6:
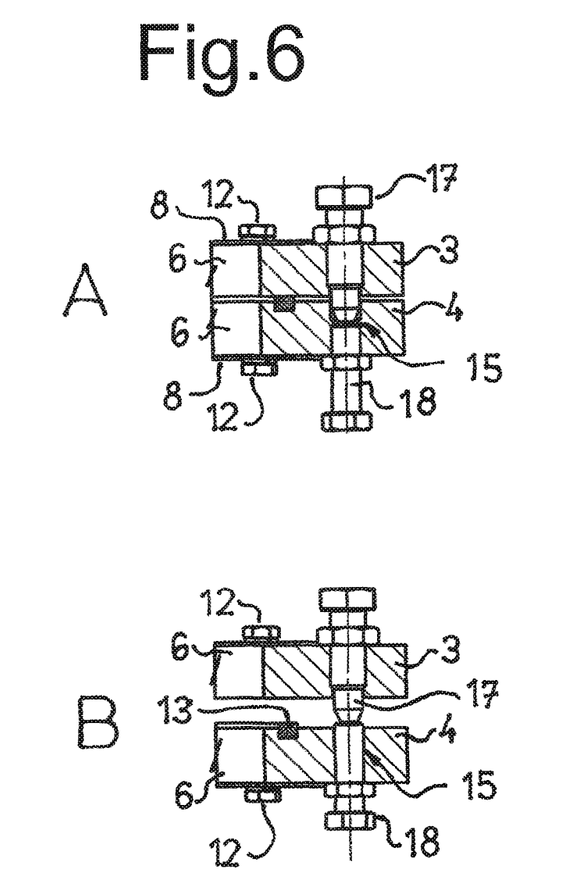

Example of the best embodiment of the invention for interconnection of two pipelines or one pipeline and a vessel or two vessels to one another is the magnetic connecting member for pipe flanges according to FIGS. 1 to 6.

This connecting member is intended for insertion and connection between the pipeline or vessel flanges not shown on figures. Accordingly, it is intended for interconnection of cavities for flow of media, which are situated inside a pipe or inside an outlet from a vessel. The contact part of the connection for the ends of channels 1, 2 being connected to one another is created by connecting plates 3, 4 of nonmagnetic material, for example special nonmagnetic steel or composite based on resins or plastics. Their backsides 5 are equipped with set of pits 6 with magnets 7 covered with clamps 8. In this particular case, six pits 6 are situated in each of the connecting plates 3, 4. The pits 6 are equipped with in them placed polarized permanent magnets 7 covered and secured with clamps 8 of magnetic material, for example ferrite, neodymium, or alloy of aluminium, nickel and cobalt. The clamps 8 are intensifying the magnetic field created and preventing unwanted release of magnets 7 during mounting or disassembly of the connection and in the "disconnected" state of the connection. In the connected position of the connection, the channels 1, 2 are interconnected and the connecting plates 3, 4 are fastened to each other, as shown on the figures FIG. 1, FIG. 4 and FIG. 6. The connecting plates 3, 4 creating this pair are made as two counterparts arranged against each other in a mirror-like way, they have mutually linked-up passages 9 for medium, mutually contiguous front surfaces 10 and their magnets 7 are laid out so that, when being in the position of the joint connection, the magnets 7 of interconnected connecting plates 3, 4 are located in opposed mating position against each other, and at the same time the counter-positioned magnets 7, i.e. those located at opposite positions, have identical polarization. Polarization of these magnets 7 is visually indicated on FIG. 2.

Magnets 7 as well as pits 6 have calculated dimensions and numbers to attain required connection capacity. It is very significant for the connection efficiency that each magnet 7 fits to the bottom of the pit 6, in which it is placed, being preferably seated here with its magnetic field axially compared with the axis of passages 9 for the medium, i.e. with the direction of its magnetic force action parallel with the axis of passages 9. The bottoms of pits 6 are equipped with at least one passage channel H each to improve penetration of magnetic field to the other side of the connecting plate 3, 4 and to facilitate removal of the magnet 7 in the case when its disassembly is required. Because the connecting plates 3, 4 are arranged in a mirror-like way, as already mentioned above, then during connection of the connecting plates 3, 4, also the passage channels H are mutually linked-up thus creating continuous hollow tunnel free of any material that would dampen the action of magnetic field.

The pits 6 as well as the magnets 7 are of cylindrical shape in the example shown and are laid out on the connecting plates 3, 4 so that axes of their cylindrical shapes are situated on imaginary circle with its center in the axis of the passage 9. The pits 6 occupied by magnets 7 are arranged on at least one such circle on each connecting plate 3, 4. The magnets 7 are laid-out on the circle at a distance from each other around the passage 9. Additionally also extra pits 6 with magnets 7 can be contained that are placed out of this imaginary circle. Even larger number of imaginary circles can be present, for example two or three, which will depend mainly on the required size and capacity of the connection. In the demonstrated example, the number of pits 6 occupied with magnets 7 on the imaginary circle is six, which ensures high reliability of the connection, since the optimum is three to ten pits 6 with magnets 7, depending on the equipment size, pressure and type of the medium, temperature etc. The neighboring magnets 7 have alternating polarization within the framework of the same circle, as shown on FIG. 2. Furthermore, attention should be paid to the fact that individual clamps 8 are created for the magnets 7 on the selected segments of imaginary circle. Optimally, individual clamp 8 is created for each pair and/or triplet of neighboring magnets 7 of the same connecting plate 3, 4. The individual clamps 8 shown in the presented example are covering always a pair of neighboring magnets 7. The clamps 8 created in this way are intensifying the required magnetic field effects.

Each clamp 8 is equipped with one clamp screw 12 against spontaneous release made of nonmagnetic material. Heads of these clamp screws 12 are located on the clamps 8 or they are countersunk in the clamps 8 and their threaded parts are fixed in the connecting plate 3, 4.

The connecting plates 3, 4 have planar and smooth front surfaces 10. Design pattern or projections etc. are not excluded for the solution according to the invention, but smooth and flat front surface 10 is a great advantage for the connection tightness. The connection tightness can be of course improved or secured by addition of sealing elements standard in this field, for example it can have form of a simple flat gasket inserted between front surfaces 10 of the connecting plates 3, 4, or gasket ring 13 placed into for this purpose made groove 14 in one of the connecting plates 4, as shown in this concrete example.

Arrangement of the connection was further improved with also original solution, namely by equipping with centering elements for the possibility of quick and precise centering of connecting plates 3, 4 during connecting the connection with such means, which are simultaneously practically usable for disconnection of the connection. The connecting plates 3, 4 connected to each other are equipped with opposite centering elements in the form of centering holes 15 and/or centering dimples 16, which are in the state of connection of connecting plates 3, 4 equipped with connecting/disconnecting means for precise connection and subsequent disconnection of connecting plates 3, 4 by pushing away. This presented example shows the embodiment variant of centering where the connecting plates 3, 4 are fixed to each other with the help of connections from mutually linked-up centering holes 15 of two connecting plates 3, 4 and connecting/disconnecting means in the form of a centering screw 17, fixed from one side of the connection and a pushing-away screw 18 fixed from the opposite side of the connection. The connecting/disconnecting means in the form of the centering screw 17 and the pushing-away screw 18 is arranged in the following way. The centering screw 17 has its head leaning on the first connecting plate 3 and is embedded through the centering hole 15 made in the connecting plate 3, where the connection as against the centering hole 15 is fixed, into a portion of centering hole 5 of the second connecting plate 4, where it is free as against the centering hole 15. The pushing-away screw 18 is embedded into the remaining portion of centering hole 15 of the second connecting plate 4 from the opposite side. In the state when the pushing-away screw 18 is only partially screwed in, the pushing-away screw 18 is embedded in the centering hole 15 of the second connecting plate 4 only partially so that it should not apply pressure to the end of the centering screw 17. The connection is in the position "connected" with the afore-said position of screws 17, 18. With further embedding of the pushing-away screw 18 by screwing, its end will start applying pressure to the here contained end of the centering screw 17 and the centering screw 17 is pushed away together with the first connecting plate 3 fastened to the centering screw 17. The connection is in the position "disconnected" in the state when the pushing-away screw 18 is fully screwed in. Simple possible alternative is such solution, that the connecting plates 3, 4 can be fixed to each other with the help of connections including centering hole 5 made in the first connecting plate 3 and linked-up to the centering dimple 16 made in the second connecting plate 4, in such case it is sufficient to use a simple connecting/disconnecting means in the form of the mere centering screw 17, which in the given case can have the form of common screw and will be imbedded through the centering hole 15 of the first connecting plate 3 into the centering dimple 16 of the second connecting plate 4. The connection is in the position "connected" in the state when the centering screw 17 is only partially screwed in, and the connection is in the position "disconnected" in the state when the centering screw 17 is fully screwed in. This variant is not shown on figures, considering the fact that it is the same principle as in the case described in the following example, where the combination of the centering hole 15 is shown and the centering dimple 16 is shown.

For the simplest embodiment of the invention, the connecting plates 3, 4 with the aforesaid accessories can be fixed directly to the end of the pipeline being connected, for example by means of a welding seam. Different, significantly more advantageous embodiment is the matter in the presented example. The connecting member presented here is embodied as a unit suitable and prepared for insertion and mounting between the conventional terminal pipe flanges without the need for welding seams and complicated manipulations with the pipeline or vessels being connected. In the preferable embodiment of the connecting member according to this example, the connecting plates 3, 4 are fixed each on one short pipeline section 19 oriented so that this pipeline section 19 runs out on the connecting plate 3, 4 backside 5, both these pipeline sections 19 having on its opposite end a classic flange 20 welded on. Such flange 20 is selected, which has the size and connecting elements as well as the passage 9 identical to the end flanges of the pipeline and/or vessel neck being connected that are not shown on figures. The connecting member creates in this way an easily connectable member equipped with bilaterally connecting flanges 20.

The connection with the help of this magnetic connecting member according to the invention will be created in the following way. The polarized magnets 7 are placed into the pits 6. The magnets 7 are covered with clamps 8 that are secured with clamp screws 12. The centering screws 17 are screwed in into the centering holes 15 through the first connecting plate 3, to the position in which their stem protrudes on the side being connected, i.e. on the front surface 10. The pushing-away screws 18 are screwed into the second connecting plate 4, but only partially so that a recess with a height allowing fitting of the protruding end of the centering screw 17 remains in the centering holes 15 of the second connecting plate 4. Flanges 20 are fastened to the end flanges of the pipeline and/or vessel being connected by means of classic flange connection. The ends of channels 1, 2 being connected are in this moment equipped with one portion of the connecting member each, and when the connecting plates 3, 4, are placed against each other, the connection can be performed. The connection will occur when the connecting plates 3, 4 will approach in mirrored position against each other to a distance when magnetic fields of their magnets 7 will start to affect each other. The connecting plates 3, 4 will jump to each other at that moment and at the same time strong adhesion of their front surfaces 10 together will take place. In a normal case the mutual position of the connecting plates 3, 4 during approaching is not exactly mirrored, it is rather slightly imprecise. However this small imprecision will be aligned by itself during approaching of the connecting plates 3, 4. When the connecting plates 3, 4 are brought near to each other to the distance at which magnetic fields of their magnets 7 will start to act, then, in consequence of the layout of the magnets 7 on the circle and their polarization, also angular rotation of the connecting plates 3, 4 in the direction of the circle will take place with further approaching in the course of their jumping to each other. In so doing, the centering screws 17 will find by themselves the recess in the counterpart, in this case consisting from the free portion of the centering hole 15 in the second connecting plate 4, after which they will snap into this recess. This will be manifested visually as well as acoustically when the connecting plates 3, 4 can visibly turn through an angle during their jumping to each other and give a click during centering. Now the correct position and strength of the connection is assured, channels 1, 2 are interconnected. With the use of connecting member designed according to the invention, it is possible to manipulate manually with the pipeline being connected, however with respect to the qualification for industrial use, it is assumed that suitable machinery such as flexible compensation pipe and machine manipulator will be used for moving the pipeline being connected. The connection seals and the interconnected channels 1, 2 can be put in operation. After finishing the operation when it is required to disconnect the connection, the disconnection is performed by pull-off asunder, while it is possible to help the disconnection on also by screwing in the pushing-away screw 18. With its end it will push out the end of the centering screw 17 from the corresponding connecting plate 4 and thus will push away the connected first connecting plate 3, this moving away will cause attenuation of the magnetic field of interacting magnets 7 and the connection will disconnect, the connecting plates 3, 4 will secede from each other.

Example 2

Figure 7:
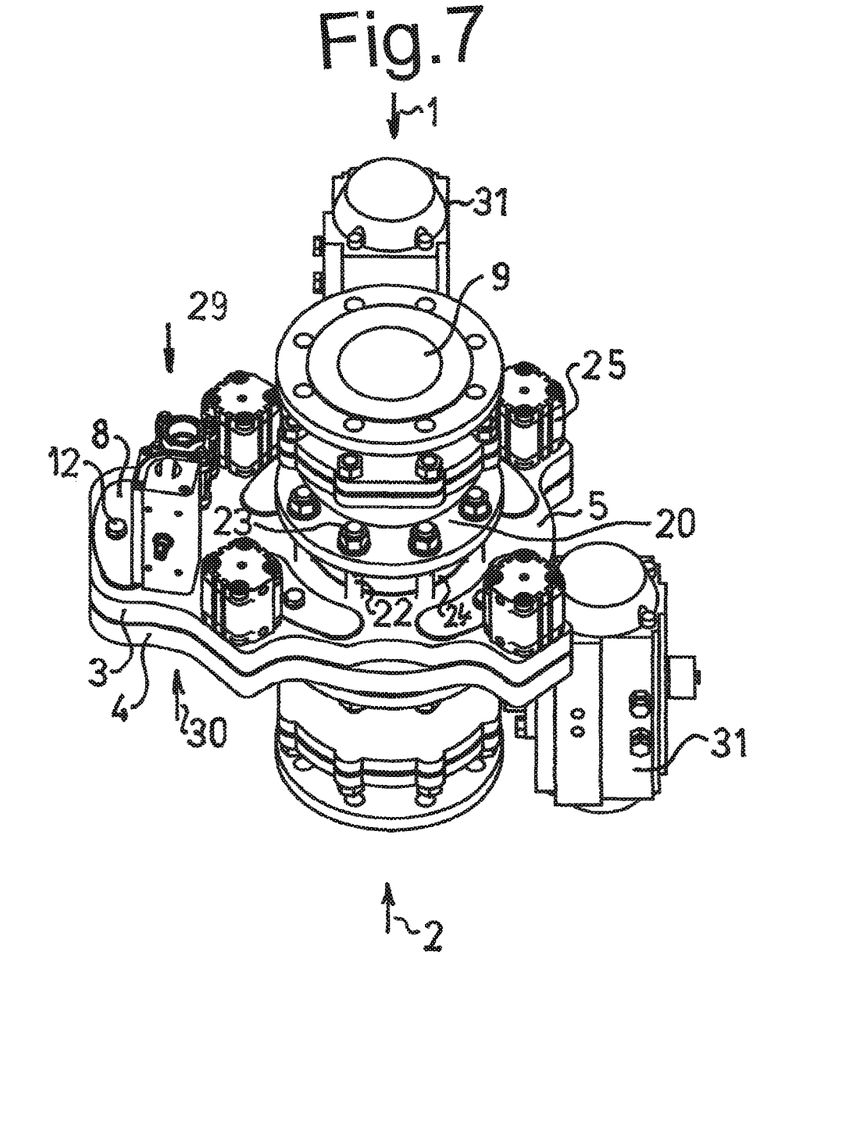
FIG. 7 shows perspective view of magnetic connecting member according to the second example of embodiment.
Figure 8:
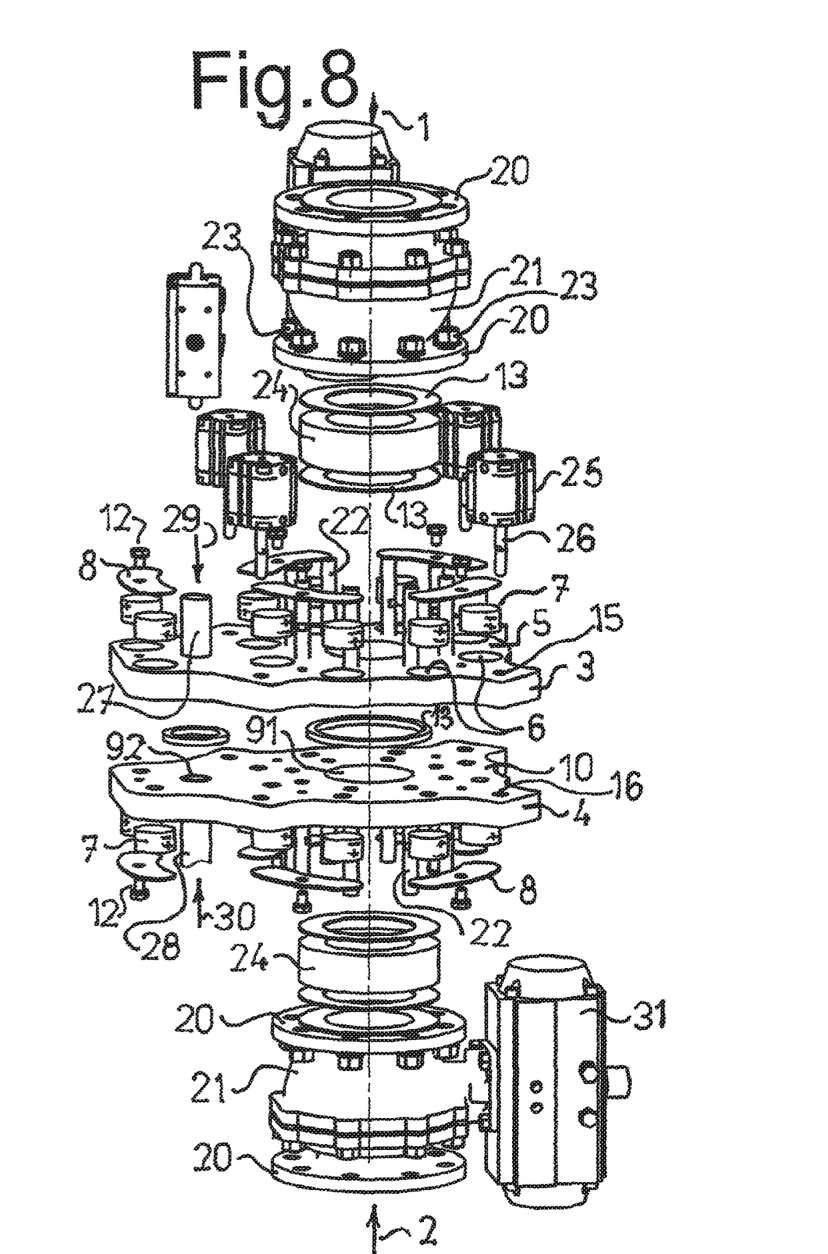
FIG. 8 shows perspective view on the same in disassembled state.
Figure 9:
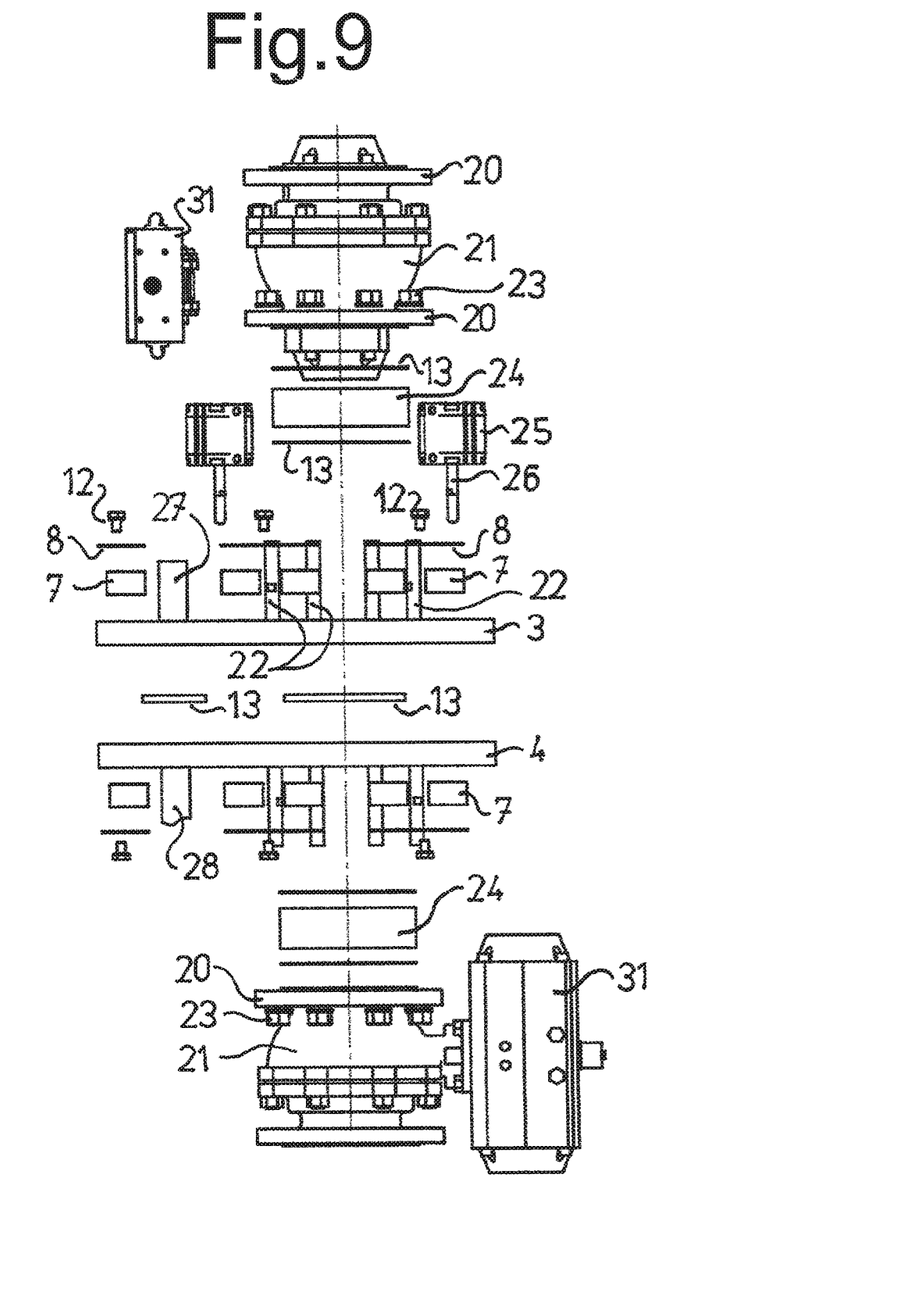
FIG. 9 shows side view on the same in a disassembled state.
Figure 10:
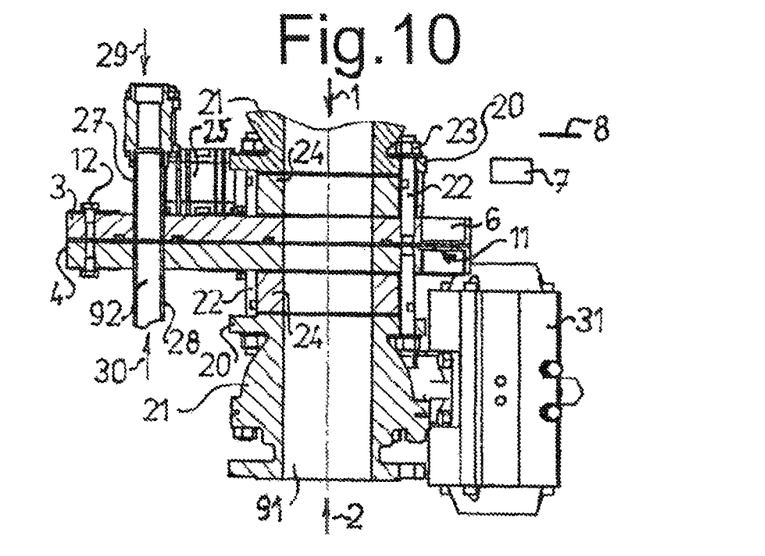
FIG. 10 shows side view of vertical section drawn along the line A-A indicated on the following figure, across the center of the same connecting member, however with the upper valve cut off, with illustration of clamp fastening and arrangement of pit before placing the magnet as well as with the placed magnet.
Figure 11:
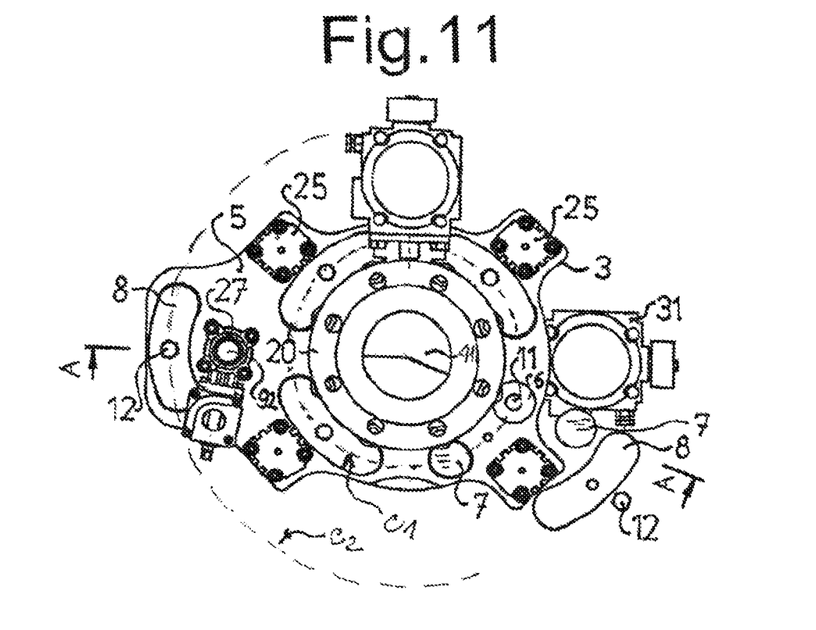
FIG. 11 shows top plan view of the assembly according to the previous figure, the connecting member has its upper valve cut off to show the arrangement of clamps and thrust elements, FIG. 12A, B shows detail of the thrust element with extensible mandrel in connected connecting plates, from which A shows it in the connected state and B in the disconnected state of connecting plates.
Figure 12:
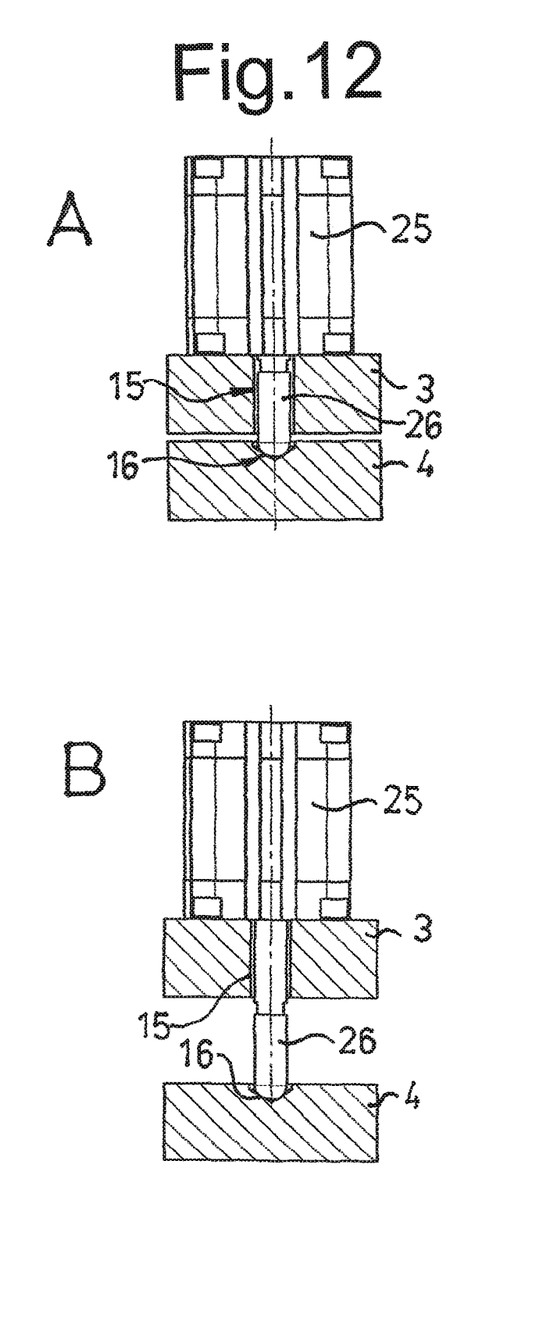

This example shows the best embodiment of the invention in the case of required interconnection of more than two pipelines and simultaneously in the case of need to connect the pipeline through a closing device 21. For these requirements, the magnetic connecting member is designed according to FIGS. 7 to 12.

Many elements are similar or the same as those described in the previous example. This magnetic connecting member also includes connecting plates 3, 4 having on their backsides 5 sets of pits 6 with magnets 7. Similarly, passage channels 1 are running out from the pits 6, passing through the remaining thickness of the connecting plate 3, 4 and leading to the opposite side of the connecting plate 3, 4 on its flat and smooth front surface 10.

In contrast to the previous example, the connecting plates 3, 4 have more passages 91, 92 created and therefore they are adequately enlarged as compared to the previous example and they are even enriched with additional elements. They are in particular equipped each with two imaginary circles with pits 6 occupied with magnets 7. In this concrete example, eight pits 6 occupied with magnets 7 are created on the first imaginary circle, the second imaginary circle is placed outside the first imaginary circle and only a section of it is occupied, two pits 6 occupied with magnets 7 are created on this circle section. The first, main passage 91 has its center in the axis of these imaginary circles. The second, additional passage 92 is situated in the annulus between these circles. Pairs of neighboring magnets 7 of both circles are equipped with magnetic clamps 8 fastened with clamp screws 12. Magnets 7 placed within the same circle next to each other have alternating polarization. Magnets 7 creating in opposed mating position a pair when being in the position of connection of connecting plates 3, 4 are polarized identically so that they attract each other. Polarization of magnets 7 is visually indicated on FIG. 8.

This example shows how the connection according to the invention is created when both pipelines being connected are terminated with a closing device 21 fitted with ending flange 20. For the reasons of capacity of drawings, the pipelines are not shown on figures, only their terminal closing devices 21 are shown, demonstrated in this case as a pneumatic valve. The closing devices 21 being; connected are connected so that each closing device 21 is connected to one connecting plate 3, 4 on its rear side 5, preferably by means of spacing posts 22, spacing screws 23, and a ring 24 inserted into the interspace/This ring 24 has the passage 9 selected according to the dimensions of the flange 20 of the closing device 21. That is why the passage 9 of the ring 24 is the same as in the flange 20, and the main passage 91 of the connecting plate 3, 4 is also created as the same passage. Each ring 24 is equipped with a gasket ring 3 on both sides. Additional gasket rings 13 are inserted between the connecting plates (3, 4) around the connection of the passages 91, 92. The spacing posts 22 have the same height as the ring 24 and run out on the backside 5 of each connecting plate 3, 4 around the ring 24 circumference and the stems of spacing screws 23 are fixed in them, while the heads of the spacing screws 23 are leaning on the opposite side of the terminal flange 20 of closing devices 21.

Centering of the connection is solved for large-capacity connecting member. The connecting plates 3, 4 are fixed to each other with the help of connections from centering holes 15 linked-up in the state of connection to the centering dimples 16, this in combination with connecting/disconnecting means in the form of a pneumatic thrust element 25 with extensible mandrel 26. In the state of connected connection, the extensible mandrel 26 of the thrust elements 25 is embedded through the centering hole 15 of the first connecting plate 3 into the centering dimple 16 of the second connecting plate 4. For the state of connected connection, the extensible mandrel 26 is in only partially extended position, when it reaches into the centering dimple 16, but is not pushing on its bottom. For the state of disconnection, the extensible mandrel 26 is extended more. The connection is in the position "disconnected" with the extensible mandrel 26 in the more or maximally extended position.

The connection with the help of this magnetic connecting member according to the invention will be created in the following way. First, the backside 5 of connecting plates 3, 4 is prepared for the connection. The polarized magnets 7 are placed into the pits 6 and secured with clamps 8 with clamp screws 12. The spacing posts 22 can be screwed out to improve manipulation and are stored elsewhere before mounting. After placing the magnets 7, these spacing posts 22 are screwed-in to the place of use, i.e. they are fixed to the backside 5 of connecting plates 3, 4 around the main passage 91 The ring 24 with gasket rings 13 placed from both sides is inserted inside the circular formation of the spacing posts 22. If the closing device 21 is not fixed to the pipeline or vessel being connected up to now, then it is mounted to them by means of its flange 20. This pipeline or vessel being connected represents the first and second channel 1, 2 being connected. This pipeline or vessel are not shown on figures for the reasons of capacity of drawings, and also because they in itself are not the subject of technical solution of the invention, only the channels 1, 2 being connected are indicated. Auxiliary pipelines 27, 28 for the next two channels 29, 30 being connected are connected to the so far disconnected connecting plates 3, 4, also on the backside 5. The auxiliary pipeline 27, 28 can serve for additional media and can have preferably the form of flexible tube with a rigid end. For better possibility of manipulation, a flexible compensator can be contained as interlink in the pipeline or between the pipeline and the closing device 2. The thrust elements 25 with extensible mandrel 26 are also placed on the connecting plates 3, 4 with the help of classic screwed joints not shown on figures. Position of the extensible mandrels 26 is controllable pneumatically or mechanically. In the example presented, the thrust elements 25 with pneumatic drive 31 for positioning of the extensible mandrel 26 are shown on figures. The extensible mandrel 26 is extended only partially so that it protrudes on the front surface 10 of the connecting plate 3, 4. There are preferably several thrust elements 25 around and in the vicinity of the circumference of connecting plates 3, 4, which will facilitate disconnection, especially later on. The connection is performed when both connecting plates 3, 4 are in completed state, with all the elements on their backsides 5. The front surfaces 10 of the connecting plates 3, 4 are equipped with the gasket rings 3 and brought near to each other in the as exact as possible position. Thanks to the polarized magnets 7 and their layout on the circle, angular rotation into the precise position will take place, and the protruding ends of the extensible mandrels 26 of the first connecting plate 3 will snap in the centering dimples 16 of the second connecting plate 4 with the contact of the front surfaces 10 of connecting plates 3, 4. After finishing of operation, the closing devices 21 are closed first. Disconnection of the connection is assisted by extending the extensible mandrels 26 that are during this extension pushing on the bottoms of the centering dimples 16 and thus are pushing the connecting plates 3, 4 away from each other. During the said pushing away, the magnetic field between the opposite magnets 7 is weakened insofar that with certain distance, it is then already easy to pull the connecting plates 3, 4 including accessories away from each other using mechanical force.

This arrangement is suitable particularly for connecting of various types of pipeline with gas in explosive environment, where control by means of electric current, which would be dangerous for the reasons of risk of spark formation and subsequent explosion, cannot be used.

LIST OF REFERENCE SIGNS 1, 2 channel
3 first connecting plate
4 second connecting plate
5 backside
6 pit
7 magnet
8 clamp
9 passage
91 main passage
92 additional passage
10 front surface
11 passage channel
12 clamp screw
13 gasket ring
14 groove
15 centering hole
16 centering dimple
17 centering screw
18 pushing-away screw
19 pipeline section
20 flange 21 closing device
22 spacing posts
23 spacing screw
24 ring
25 pressing element
26 extensible mandrel
27, 28 additional pipe
29, 30 additional channels
31 drive

The invention claimed is:

1. A magnetic connecting member for pipe flanges, intended for interconnecting channel ends conveying gaseous or liquid medium, the channels are located in a pipeline and/or a vessel the magnetic connecting member comprising two connecting plates of nonmagnetic material, the connecting plates are fastened to each other and are arranged as counterparts with mutually aligned passages and mutually contiguous front surfaces, the connecting plates are provided with polarized magnets, the magnets of the interconnected connecting plates being located in opposed mating position against each other the opposite magnets having identical polarization, the magnets are placed in pits made in the back sides of each of these connecting plates, and the magnets are covered with clamps of magnetic material to prevent unwanted release of the magnets from the connecting plates, wherein the magnet is inserted into and contacts bottom of the pit, the bottom of the pit is equipped with at least one passage channel to facilitate penetration of a magnetic field and to facilitate removal of the magnet in the case of disassembly.

2. The magnetic connecting member for pipe flanges, according to claim 1 wherein the pits occupied by the magnets are located on the connecting plates on at least one imaginary circle with its center in the axis of the passage, the circles on the connecting plates being connected to each other are identical, and the neighboring magnets on the same connecting plate have alternating polarization next to each other within the framework of the same circle.

3. The magnetic connecting member for pipe flanges, according to claim 2 wherein at least one imaginary circle contains 3 to 10 magnets that are laid-out here in a distance from each other around the passage, the individual clamps for each pair and/or triplet of the neighboring magnets are located on each contained imaginary circle.

4. The magnetic connecting member for pipe flanges, according to claim 3 wherein the clamp is equipped with at least one clamp screw made of nonmagnetic material, the threaded part of the clamp screw is fixed in the connecting plate.

5. The magnetic connecting member for pipe flanges, according to claim 2 wherein the connecting plates have planar and smooth front surfaces.

6. The magnetic connecting member for pipe flanges, according to claim 2 wherein the connecting plates being connected to each other are equipped with opposite centering elements to facilitate connection in a precise position, where these centering elements are in the form of centering holes and/or centering dimples fitted with connecting/disconnecting means for precise connection and subsequent disconnection of said connecting plates.

7. The magnetic connecting member for pipe flanges, according to claim 6 wherein the connecting plates are fixed to each other with the help of connections from mutually linked-up centering holes of two connecting plates, connecting/disconnecting means in the form of a centering screw imbedded through the centering hole of the first connecting plate into a part of the centering hole of the second connecting plate, and including a pushing-away screw imbedded into the remaining portion of the centering hole of the second connecting plate from the opposite side, wherein the connection is in a connected position when the pushing-away screw is only partially screwed in, and the connection is in a disconnected position when the pushing-away screw is fully screwed in.

8. The magnetic connecting member for pipe flanges, according to claim 6 wherein the connecting plates are fixed to each other with the help of connections from the centering hole linked-up to the centering dimple, and the connecting/disconnecting means in the form of a centering screw imbedded through the centering hole of the first connecting plate into the centering dimple of the second connecting plate while the connection is in a connected position with the centering screw only partially screwed in, and the connection is in a disconnected position with the centering screw fully screwed in.

9. The magnetic connecting member for pipe flanges, according to claim 6 wherein the connecting plates are fixed to each other with the help of connections from the centering hole linked-up to the centering dimple, and the connecting/disconnecting means in the form of a thrust element with an extensible mandrel imbedded through the centering hole of the first connecting plate into the centering dimple of the second connecting plate, wherein the connection is in a connected position when the extensible mandrel is only partially protruded, and the connection is in a disconnected position when the extensible mandrel is maximally protruded.

10. The magnetic connecting member for pipe flanges, according to claim 2 wherein the connecting plates being connected to each other are each equipped with the magnets arranged circumferentially around the plate in two concentric circles and with at least two passages, of which the first one, a main passage has its center in the axis of the concentric circles, and each next additional passage is situated in the annulus between the concentric circles.

11. The magnetic connecting member for pipe flanges, according to claim 2 wherein at least one connecting plate is equipped with a pipeline section running out at its back side from its passage and terminated with a flange mountable to an identical flange located at the end of pipeline and/or vessel neck being connected.

12. The magnetic connecting member for pipe flanges, according to claim 2 wherein the pipeline being connected is ended with a closing device with a terminal flange and the closing device is connected to the connecting plate on its back side by means of spacing posts, spacing screws, and a ring inserted between the connecting plate and the closing device.

13. The magnetic connecting member for pipe flanges, according to claim 12 wherein the ring has the same passage as the connecting plate as well as the flange of the closing device being connected, and is on both sides equipped with a sealing ring, wherein the spacing posts run out on the back side of the connecting plate around the ring circumference, the spacing screws connect the terminal flange of the closing device to the spacing posts.

* * * * *